United States Patent

Nagata

[11] Patent Number: 6,079,287
[45] Date of Patent: Jun. 27, 2000

[54] LOCKING DEVICE

[75] Inventor: Shojiro Nagata, Akishima, Japan

[73] Assignee: Tachi-S Co., Ltd., Tokyo, Japan

[21] Appl. No.: 09/124,014

[22] Filed: Jul. 29, 1998

[51] Int. Cl.[7] .................................................. F16H 27/02
[52] U.S. Cl. ............................ 74/89.15; 74/586; 297/361
[58] Field of Search .......................... 74/89.15, 424.8 R, 74/586, 89.16; 297/361, 365, 375, 374; 188/134, 196 D, 67, 265, 371

[56] References Cited

U.S. PATENT DOCUMENTS

| | | | |
|---|---|---|---|
| 683,555 | 10/1901 | Dodge | 74/586 |
| 853,210 | 5/1907 | Anderson | 74/586 |
| 1,166,465 | 1/1916 | Luburg | 74/586 |
| 1,342,319 | 6/1920 | Anderson | 74/586 |
| 4,295,389 | 10/1981 | Geisthoff et al. | 74/586 |
| 4,479,398 | 10/1984 | Watanabe | 74/89.15 |
| 5,070,969 | 12/1991 | Neumuller | 297/361 X |
| 5,634,534 | 6/1997 | Kanai et al. | |

FOREIGN PATENT DOCUMENTS

| | | |
|---|---|---|
| 50-84305 | 7/1975 | Japan . |
| 50-95710 | 8/1975 | Japan . |
| 63-123158 | 8/1988 | Japan . |
| 322110 | 3/1991 | Japan . |

*Primary Examiner*—David A. Bucci
*Assistant Examiner*—Marcus Charles
*Attorney, Agent, or Firm*—Browdy and Neimark

[57] ABSTRACT

A locking device having a tubular body, in which a stationary nut member is fixed and a lead screw is threadedly engaged with and through the stationary nut member. A lock nut member is threadedly engaged about the lead screw and biased by a biasing element to a frictional contact with the stationary nut member, so that a friction is caused between those two nut members, thereby preventing a relative threaded movement between the lead screw and the stationary nut member and thus normally setting this locking device in a locked state. The lock nut member may be rotated by an operation element about the lead screw against the biasing element so as to bring the lock nut member itself out of contact with the stationary nut member, thereby allowing the relative threaded movement between the lead screw and stationary lock member for an unlocking purpose.

5 Claims, 3 Drawing Sheets

LOCKING DEVICE

BACKGROUND OF INVENTION

1. Field of the Invention

The present invention relates to a locking device for use with an automotive seat, and in particular to a longitudinal locking device for locking and unlocking a movable part of the seat.

2. Description of Prior Art

An automotive seat is provided with a locking device for locking and unlocking the movable and adjustable parts or devices associated with the seat, such as a reclining device for adjusting an inclination angle of seat back of the seat, or a device for fine adjustment of inclination of an armrest provided in the seat.

Various locking devices of this kind are made available for a particular purpose in the seat. One of them is a well-known gear locking type comprising a plural number of gears, wherein some of them are combined together to form a locking gear, while another of them form in combination an unlocking gear. But, this conventional device is obviously a very complicated structure requiring a high precision in plural associated parts thereof. Further, when an incomplete or half locking occurs therein, the gears are wobbled and contacted with one another to generate an unpleasant or noisy sound.

Recently, instead of such intricate gear structure, there is made available a spring locking device which is simple in using one coil spring and a spindle or tubular body to form a locking and unlocking element, as disclosed from the Japanese Laid-Open Pub. 50-95710 for example. According to this prior art, the coil spring is wound around the spindle, such that the spring itself can be twisted into a frictional contact about the spindle for a locking action. However, this will not give a smooth and sufficient locking effect in practical operation, and will generate a keen objectionable noise therefrom.

SUMMARY OF THE INVENTION

In view of the above-stated drawbacks, it is therefore a primary purpose of the present invention to provide an improved locking device which is simple in structure and does not generate an unpleasant noise.

In order to achieve such purpose, the locking device in accordance with the present invention is basically comprised of:

- a tubular body having an opened end portion and a base end portion opposite to the opened end portion;
- a stationary lock nut means fixed to the opened end portion of tubular body;
- a lead screw means which is engaged threadedly with and through the stationary lock nut means such that a part of the lead screw means is disposed in the tubular body while one end portion thereof projects from the stationary lock nut means;
- a lock nut means engaged threadedly with the lead screw means, the lock nut means being disposed thereon in contact with the stationary lock nut means;
- a biasing means for normally biasing the lock nut means to a frictional contact with the stationary lock nut means so as to normally prevent a relative threaded movement between the stationary nut means and lead screw means; and
- an operation means operatively connected with the lock nut means, which operation means is operable to cause said lock nut means to rotate threadedly about the lead screw means in a direction out of contact with the stationary nut means against a biasing force of the biasing means.

Accordingly, the lock nut means is normally retained in a frictional contact relation with the stationary lock nut means to lock the stationary nut member against threaded movement along the lead screw. Thus, even if an incomplete or half locked state occurs between the two nut means, any unpleasant noise will not be generated therefrom. Further, its structure is quite simple and almost free of failure, hence contributing to a low-cost, reliable production of this locking device. Moreover, such frictional locking manner completely avoids a locking trouble due to a wearing of the lead screw.

Preferably, the lead screw means may comprise a lead screw having three or six threads helically formed thereabout.

Preferably, the lead screw means may have a lead angle set within a range of 20 to 25 degrees and a pressure angle set within a range of 10 to 16 degrees.

Other features and advantages of the present invention will become apparent from reading of the description hereinafter with reference to the annexed drawings.

DETAILED DESCRIPTION OF PREFERRED EMBODIMENT OF THE INVENTION

Figure 1:
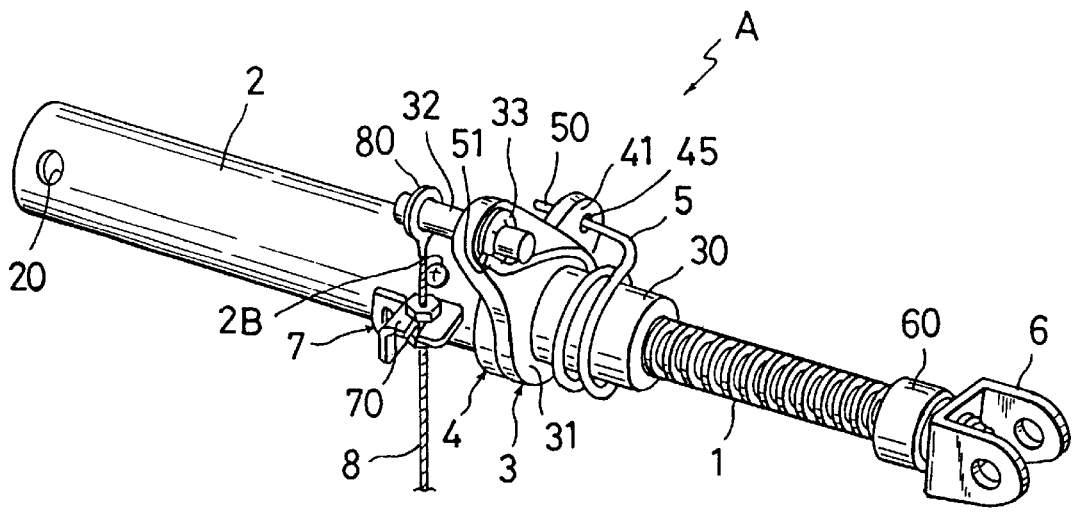
FIG. 1 is a partly broken, schematic perspective view of a longitudinal locking device in accordance with the present invention.
Figure 5:
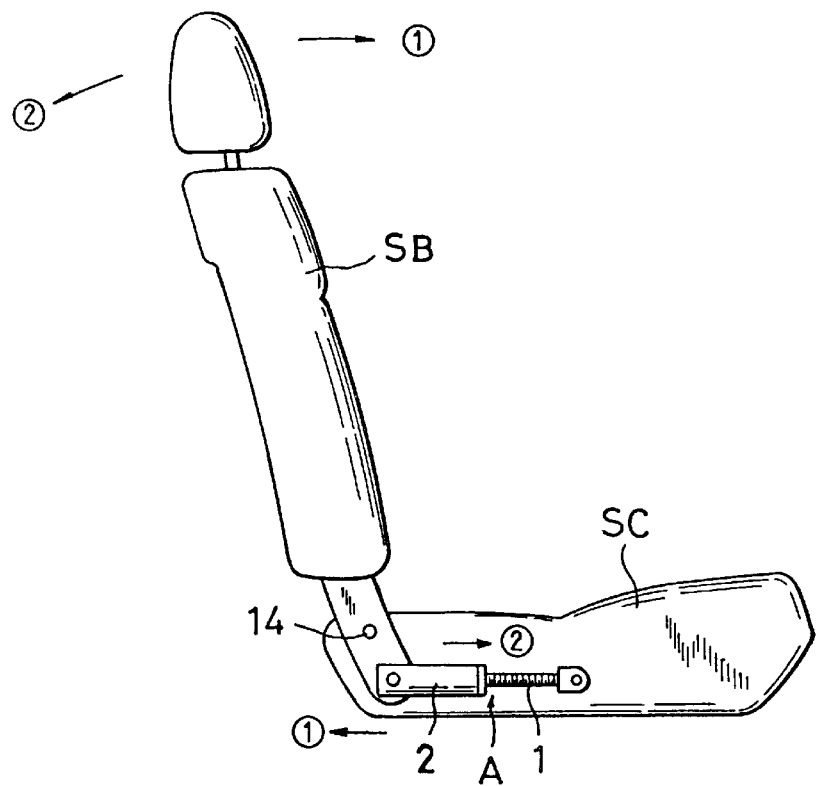
FIG. 5 is a front view of the locking device, showing the state where it is used with an automotive seat.

FIG. 1 shows, in perspective, a whole of a longitudinal locking device in accordance with the present invention, as generally designated by (A), which may be used with an automotive seat shown in FIG. 5.

The illustrated longitudinal locking device (A) is basically comprised of: a lead screw (1); a tubular body (2) in which the lead screw (1) is supported for movement in the longitudinal direction thereof; a lock nut member (3) engaged threadedly with the lead screw (1); a stationary lock nut member (4) fixed to the tubular body (2), which is also engaged threadedly with the lead screw (1); and a coil-type torsion spring (5) which is connected between the the lock nut member (3) and stationary nut member (4) so as to permit them to be forcibly contacted with each other.

Figure 2:
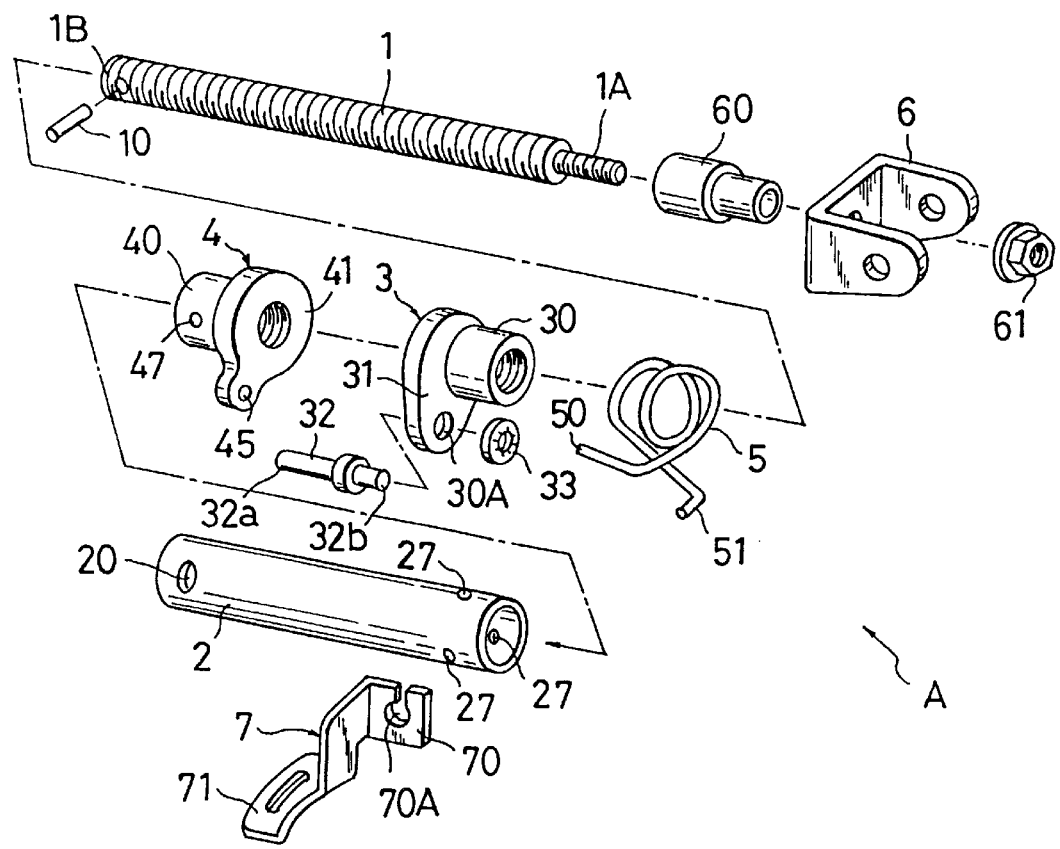
FIG. 2 is a schematic exploded perspective view of the longitudinal locking device.
Figure 3:
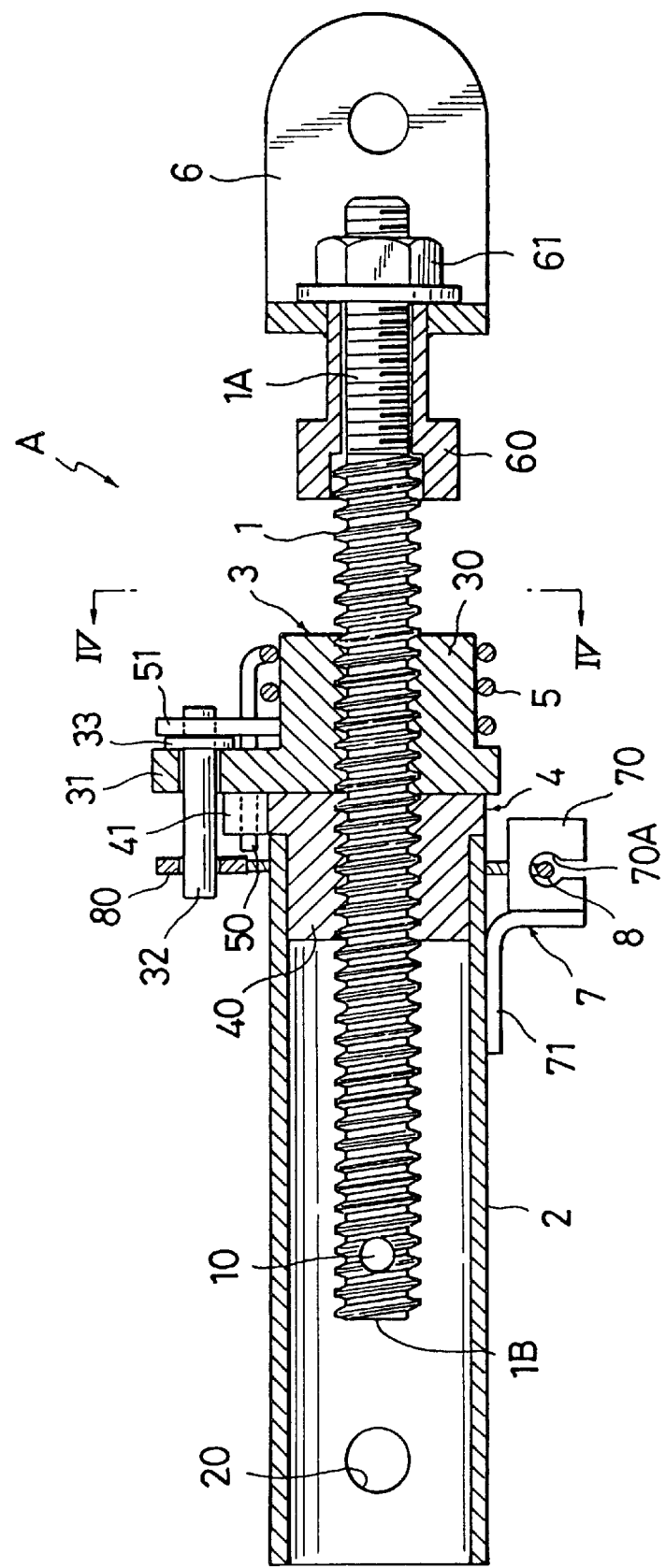
FIG. 3 is a partly broken schematic longitudinally sectional view of the locking device.

Designations (6) and (60) denote a connecting bracket and a sleeve, respectively. As seen in FIGS. 2 and 3, the connecting screw end portion (1A) of the lead screw (1) is rotatably connected and secured via the sleeve (60) and nut (61) to the connecting bracket (6). Designation (20) denotes a connecting hole formed in the base end of the tubular body (2). Hence, as can be seen in FIG. 5, the connecting bracket (6) and hole (20) may be connected as by bolts to a seat cushion (SC) of automotive seat and a lower arm of seat back (SB) of the same automotive seat, respectively, so as to mount the present locking device (A) to the seat for the purpose of locking and unlocking the inclination of seat back (SB), for instance.

The lead screw (1) is of a multiple thread screw type having a predetermined plurality of external threads formed thereon. The lead screw (1) has a hole (1B) formed in the base end thereof, in which a stopper pin (10) is secured in a manner projecting its two ends from the opposite sides of lead screw (1), and a connecting screw end portion (1A) formed in the free end thereof which has been described above.

With particular reference to FIG. 2, the lock nut member (3) is formed by an internal threaded portion (30) and a contact portion (31) in an integral manner. The internal threaded portion (30) is threadely engaged with and about the external threads of the foregoing lead screw (1). As shown, the contact portion (31) is large in diameter relative to the internal threaded portion (30), expanding outwards radially therefrom in a generally egg-like shape having a tapered projection area. A connecting hole (30A) is formed in that tapered projection area of contact portion (31).

As also shown in FIG. 2, the stationary lock nut member (4) is formed generally in a similar outer shape to the foregoing lock nut member (3), such as to have an internal threaded portion (40) for threaded engagement with and about the external threads of lead screw (1) and a contact portion (41) large in diameter relative to the internal threaded portion (40). The contact portion (41) expands outwards radially from the internal threaded portion (40) in a shape having a projected part therein. A connecting hole (45) is formed in that projected part of contact portion (41). While not shown clearly, three securing holes (47) are formed in the internal threaded portion (40) in an equidistant fashion from one another along the periphery thereof.

As also shown in FIG. 2, the tubular body (2) has three securing holes (27) formed on the peripheral surface thereof in a mutually equidistant fashion. The three securing holes (27) are disposed at an opened free end portion of tubular body (2) such as to correspond to the respective three securing holes (47) associated with the stationary nut member (4). Designation (20) indicates a pair of connecting holes penetrated through the base end portion of tubular body (2), though not shown clearly.

The coil-type torsion spring (5) is formed in the illustrated manner, having a first connecting end (51) oriented diameter-wise of the coiled body of spring (5) and a second connecting end (50) extending along the longitudinal direction of the coiled body of spring (5) and across the first connecting end (51). As will be explained, the spring (5) normally biases the contact portion (31) of lock nut member (3) to a frictional contact with that (41) of stationary lock nut member (4), thereby producing a friction between those two contact portions (31)(41) to prevent threaded rotation of the lock nut member (3) about the lead screw (1). Thus, the stationary lock member (4) is normally prevented against threaded movement along the lead screw (1).

Designation (32) denotes a connecting pin (32), one end (32b) of which passes through the connecting hole (30A) associated with the lock nut member (3), projecting therefrom. Such one end (32b) of connecting pin (32) is firmly secured in the hole (30A) via a suitable securing ring (33) having radially extending small slits. This connecting pin (32) has another end (32a) extending in a direction opposite to that one end (32b).

Designation (8) stands for a wire, one of operation means for operating this locking device (A), which may be remotely controlled by an operation lever (not shown) and is connected at its ringed end portion (80) with the above-stated another end (32a) of connecting pin (32), so that operating the operation lever will transmit an operation force via the wire (8) to the connecting pin (32), thereby causing the lock nut member (3) to rotate threadedly about the lead screw (1) for a locking purpose to be set forth later.

Figure 4:
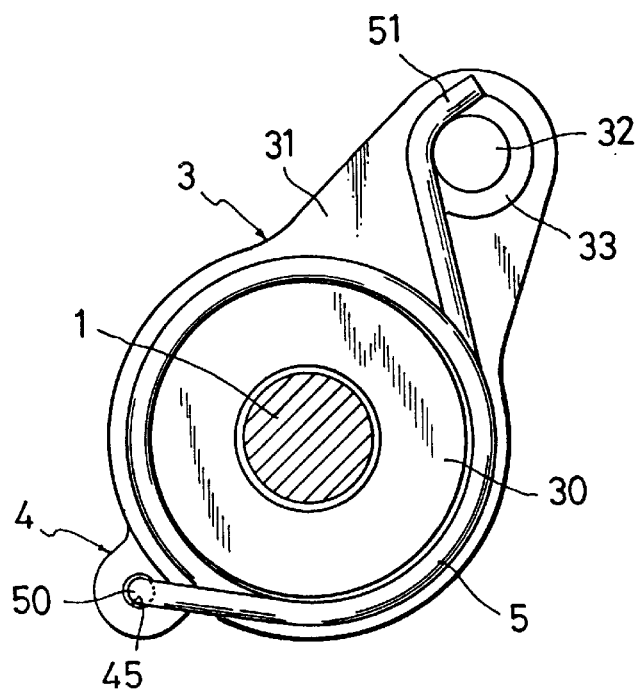
FIG. 4 is a sectional view taken along the line IV—IV in the FIG. 3.

In assembly, the stationary lock nut member (4) is fixed to the free opened end portion of tubular body (2) by inserting its cylindrical part of internal threaded portion (40) into the bore of tubular body (2) and driving three screws in the respective three aligned securing holes (27)(47) mentioned above, so that the contact portion (4) of stationary lock nut member (4) faces outwardly from the tubular body (2). Then, the lock nut member (3) with the connecting pin (32) secured therein as stated earlier is joined with the stationary lock nut member (4), such that the outer flat surface of contact portion (31) of the former is in contact with that of contact portion (41) of the latter, as seen in FIGS. 1 and 3. Next, the first connecting end (51) of torsion spring (5) is engaged over the connecting pin end (32b) secured at the lock nut member (3), while on the other hand, the second connecting end (50) is fitted in the connecting hole (45) of stationary nut member (4), as shown in FIGS. 1 and 4. Thereafter, the lead screw (1) is engaged threadedly with and through both internally threaded portions (30)(40) of the lock and stationary lock nut members (3)(4). Finally, the ringed end (80) of wire (8) is engaged about the end portion (32a) of connecting pin (32). The wire (8) may be slidably supported by a support bracket (7). Support bracket (7) is shown in FIG. 2 to have an arcuate securing end portion (71) and a projected support end portion (70) having a slit (70A). As shown in FIG. 1, the arcuate securing end portion (71) of this bracket (7) is fixed on the peripheral surface of tubular body (2), while the projected support end of the same bracket (7) extends horizontally from the tubular body (2). Hence, the wire (8) is slidably fitted in the slit (70A) for vertical movement relative to the horizontal axis of tubular body (2).

The thus-formed longitudinal locking device (A) may be mounted to the automotive seat as a locking device of reclining angle, as shown in FIG. 5 for instance. That is, the connecting bracket (6) thereof may be pivotally connected via a pin or bolt to the lateral wall of seat cushion (SC), whereas likewise the base end of tubular body (2) thereof be pivotally connected to the lower arm of seat back (SB). According to this mode, forward and backward inclination of the seat back (SB) relative to a hinge pin (14) as indicated by the arrows ① and ② will cause the stationary nut member (4) to move threadedly along the lead screw (1) in the forward and backward directions ② and ①, respectively. In this respect, in accordance with the present invention, as stated above, the lock nut member (3) is normally biased at its contact portion (31) by the torsion spring (5) into pressed contact with the contact portion (41) of stationary nut member (4), whereby the lock nut member (3) is normally prevented against threaded rotation about the lead screw (1), thus locking both stationary lock nut member (4) and tubular body (2) against movement along the lead screw (1). Under this locked state, the seat back (SB) is also locked at a certain inclination angle in relation to the seat cushion (SC). When it is desired to adjust the inclination angle of seat back (SB), a user would draw an operation lever (not shown) connected with the wire (8), in which case, the wire (8) is drawn to cause the lock nut member (3) to rotate threadedly about the lead screw (1) in a direction away from the stationary nut member (4), overcoming the biasing force of torsion spring (5). Consequently, as there is no friction between the two contact portions (31)(41) respectively of the lock and stationary nut members (3)(4), the stationary lock nut member (4) allows smooth mutual threaded rotation with the lead screw (1), with the result that the seat back (SB) may be freely rotated about the hinge pin (14) and thus inclined at any angle in relation to the seat cushion (SC). Once a desired inclination angle of seat back (SB) is determined, the user may release the operation lever to let the lock nut member (3) returned to the biased frictional contact relation with the stationary lock nut member (4) so as to lock the seat back (SB) at the given inclination angle.

In this context, the lead screw (1) may preferably be the so-called three-thread or six-thread lead screw having a trapezoidal cross-section of each thread. The three-thread lead screw is hereby defined as a screw wherein three threads lie helically about its columnar body. Likewise, the six-thread lead screw is defined as a screw wherein six threads lie helically about its columnar body. Further, it is preferable that the lead screw (1) should have a selected one of 20 to 25 degrees in lead angle and a selected one of 10 to 16 degrees in pressure angle. Experiments show that these numerical conditions insure to provide a most rapid threaded translation of both stationary and lock nut members (4)(3) along the lead screw (1), and that if a lead screw is used in excess of or below those physical numerical conditions, any smooth threaded relation will not be attained between the lead screw (1) and both of stationary and lock nut members (4)(3).

Accordingly, it is appreciated that the present invention is endowed with the following advantages:

(I) The lock nut member (3) is normally retained in a frictional contact relation with the stationary lock nut member (4) to lock the stationary lock nut member (4) against threaded movement along the lead screw (1). Thus, even if an incomplete or half locked state occurs between the two nut members (3)(4), any unpleasant noise will not be generated therefrom. Further, its structure is quite simple and almost free of failure, hence contributing to a low-cost, reliable production of this locking device. Moreover, such frictional locking manner completely avoids a locking trouble due to a wearing of the lead screw.

(II) Since the lead screw (1) can be a multiple thread screw such as three-thread or six-thread lead screw with the above-specified lead and pressure angle conditions (not shown), both stationary and lock nut members (4)(3) may be rapidly moved threadedly along the lead screw (1) with a small amount of force applied thereto. Further, those two nut members (4)(3) can be adjusted finely in position on the lead screw (1), so that a user can attain a fine inclination angle adjustment of the seat back (SB) and lock the same at a desired angle precisely relative to the seat cushion (SC).

While having described the present invention as above, it should be understood that the invention is not limited to the illustrated embodiment, but any other modifications, replacements and additions may structurally be applied thereto without departing from the scopes of the appended claims.

What is claimed is:

1. A locking device comprising:
    a tubular body having an opened end portion and a base portion opposite to said opened end portion;
    a stationary lock nut means fixed in said opened end portion of said tubular body, said stationary lock nut means having a side;
    a lead screw means which is engaged threadedly with and through said stationary lock nut means such that a part of the lead screw means is disposed in said tubular body while one end portion thereof projects from said stationary lock nut means;
    a lock nut means engaged threadedly with said lead screw means, said lock nut means having a side and being so disposed on the lead screw means that the side thereof is in frictional contact with said side of said stationary lock nut means;
    a biasing means for normally biasing said lock nut means in a direction to retain the side of said lock nut means in pressed frictional contact with the side of said stationary lock nut means to thereby block threaded rotation of the lock nut means about said lead screw means and thus normally prevent a relative threaded movement between said stationary nut means and said lead screw means; and
    an operation means operatively connected with said lock nut means, said operation means being operable to cause said lock nut means to rotate threadedly about said lead screw means in a direction to bring the side of said lock nut means out of the pressed frictional contact with the side of said stationary lock nut means against a biasing force of said biasing means.

2. The locking device as defined in claim 1, wherein said stationary lock nut means has an internal threaded portion engaged threadedly about said lead screw means, and a contact portion large in diameter relative to said internal threaded portion, wherein likewise, said lock nut means has an internal threaded portion engaged threadedly about said lead screw means and a contact portion larger in diameter relative to said internal threaded portion, and wherein the contact portion of said lock nut means is biased by said biasing means to the frictional contact with the contact portion of said stationary nut means.

3. The locking device as defined in claim 1, wherein said biasing means comprises a coiled torsion spring, and wherein one end of said coiled torsion spring is connected with said stationary lock nut means, while another end thereof is connected with said lock nut means.

4. The locking device as defined in claim 1, wherein said side of stationary lock nut means has a contact portion extending radially from the tubular body, and said side of lock nut means has a contact portion extending radially from a body of the lock nut means such as to allow frictional contact relation with said side of stationary lock means.

5. The locking device as defined in claim 1, wherein the contact portion of the stationary lock nut means and the contact portion of the lock nut means both have a flat surface for mutual contact therebetween.

* * * * *